US006431398B1

(12) United States Patent
Cook et al.

(10) Patent No.: US 6,431,398 B1
(45) Date of Patent: Aug. 13, 2002

(54) DISPENSING MEAN FOR VENDING MACHINE

(75) Inventors: James Edward Cook; Barry William Davies; Ross Nicholson; Brendyn Rodgers, all of Melbourne (AU)

(73) Assignee: Nida Group Pty Ltd, Mt. Eliza (AU)

( * ) Notice: Subject to any disclaimer, the term of this patent is extended or adjusted under 35 U.S.C. 154(b) by 0 days.

(21) Appl. No.: 09/638,537

(22) Filed: Aug. 14, 2000

Related U.S. Application Data

(63) Continuation-in-part of application No. PCT/AU99/00085, filed on Feb. 12, 1999.

(30) Foreign Application Priority Data

Feb. 12, 1998 (AU) ........................................ PP1792/98

(51) Int. Cl.[7] ........................................ B65G 59/00
(52) U.S. Cl. ........................................ 221/124; 221/241
(58) Field of Search ................................ 221/7, 13, 67, 221/123, 124, 129, 241, 268, 258; 312/45, 42

(56) References Cited

U.S. PATENT DOCUMENTS

| | | | | |
|---|---|---|---|---|
| 3,349,961 A | | 10/1967 | Nathan et al. | 221/125 |
| 4,036,400 A | | 7/1977 | Oden | 221/67 |
| 4,460,107 A | | 7/1984 | Lindsey | 221/67 |
| 4,768,680 A | | 9/1988 | Mehlan et al. | 221/123 |
| 4,917,264 A | * | 4/1990 | Gasiel et al. | 221/124 |
| 5,529,207 A | * | 6/1996 | Oden et al. | 221/67 |

FOREIGN PATENT DOCUMENTS

| | | | |
|---|---|---|---|
| EP | 0707291 A2 | | 4/1996 |
| IT | WO95/30213 | | 4/1995 |
| JP | 06044455 A | | 2/1994 |
| WO | WO93/24907 | * | 12/1993 |

* cited by examiner

*Primary Examiner*—Kenneth W. Noland
(74) *Attorney, Agent, or Firm*—Flanagan & Flanagan; John R. Flanagan

(57) ABSTRACT

A vending machine includes a plurality of vending channels defined by parallel upright walls spaced across an upper part of the vending machine. Each wall of the vending machine defining the vending channels ends at a common lower height with escape openings at the lower ends of each vending channel. A plurality of circular cross sectional containers, being cans or bottles, can be stacked in a lying position within the vending channels and can escape through the respective lower escape openings. A dispensing arrangement is located below the plurality of the vending channels and includes a plurality of releasing mechanisms located adjacent each other and able to be separately or jointly controlled so that the vending channels can be divided into defined portions to receive different sized containers or different content containers and the required separate or adjacent releasing mechanisms can be activated to dispense the required container from the defined portion of the vending channel.

24 Claims, 11 Drawing Sheets

DISPENSING MEAN FOR VENDING MACHINE

CROSS-REFERENCE TO RELATED APPLICATION

This is a continuation-in-part application under 35 U.S.C. 111(a) claiming the benefit under 35 U.S.C. 120 of the filing date of copending PCT international application No. PCT/AU99/00085 which designates the United States, has an international filing date of Feb. 12, 1999, and claims priority from Australian application No. PP 1792, filed Feb. 12, 1998.

TECHNICAL FIELD

The present invention relates to a dispensing means for use in a vending machine for selectively dispensing containers having a circular cross sectional shape.

BACKGROUND ART

Vending machines are in common usage throughout the world and generally include a plurality of parallel upright vending channels in which are stored a plurality of soft drink containers having a circular cross-section. The vending channels can be in fluid communication with a refrigeration system to allow refrigerated air to circulate and cool the soft drink containers. Various forms of dispensing means are located at the lower end of each channel which allow for single dispensing of the required soft drink following payment and selection.

In the vending industry it is usual for a vending machine to be particularly constructed for one configuration of vending channels and with particular allocated dispensing means limited to dispense containers only from a predetermined vending channel. The dispensing means must be purpose built therefore not allowing for easy and cost effective retrofitting of a plurality of dispensing means. Access to the dispensing means for service of various parts of the vending machine, is generally limited and requires the vending machine to be out of operation for a considerable time. As vending machines are usually refrigerated, the machine is not commercially useable until expiration of a further down time in which the containers must be sufficiently refrigerated following completion of the service or repair of the vending machine. Another problem of known vending machines is the need for a plurality of vending channels to be able to hold different quantities of different types of soft drinks so that a large quantity of the most popular soft drink is available while still allowing smaller quantities of the less popular soft drinks. Also vending machines generally cannot cater for a range of sizes of containers.

It is therefore an object of the invention to provide a vending machine that overcomes or ameliorates one or more of the above problems by providing more flexibility and accessibility of a vending machine and its components.

It is also an object of the invention to provide a vending machine with an improved dispensing means.

DISCLOSURE OF INVENTION

In accordance with one aspect of the invention, there is provided a dispensing means which is located below a plurality of vending channels defined by spaced upright walls with the containers to be dispensed lying within the vending channels, the dispensing means including a plurality of releasing mechanisms located adjacent each other and able to be separately or jointly controlled so that the vending channels can be divided into defined portions to receive different sized containers or different content containers and the required separate or adjacent releasing mechanisms can be activated to dispense the required container from the defined portion of the vending channel.

In one form there is a separate dispensing means which is able to be located below a plurality of vending channels defined by spaced upright walls with the containers to be dispensed lying within the vending channels, the dispensing means including a plurality of releasing mechanisms which allow dispensing from one vending channel or portion and able to be controlled externally of the dispensing means. The separate dispensing means includes a bank of releasing mechanisms mounted on a carrier that is separably removable from the dispensing means. In one form of the invention the dispensing means includes a plurality of releasing mechanisms located adjacent each other and able to be separably or coactively controlled so that a vending channel can be divided into longitudinal portions to receive different sized containers and the required separate or adjacent releasing mechanisms can be activated to dispense the required container from the allocated portion of the vending channel. The plurality of adjacent releasing mechanisms which are able to dispense from different longitudinal portions of a vending channel are mounted on a carrier which is separably removable from the dispensing means.

In one form of the invention there is provided a dispensing means having a plurality of releasing mechanisms able to be activated by respective solenoids which are controllable externally of the dispensing means.

In another form of the invention, there is provided a dispensing means having a plurality of manual releasing mechanisms which are operable by a linear drive means mounted adjacent a plurality of releasing mechanisms and including a linear track and a solenoid bank able to travel along the linear track and engage a selected one or more of the releasing mechanisms to cause a container to be released from a selected vending channel or portion.

In accordance with another aspect of the invention there is provided a vending machine having a dispensing means located below a plurality of vending channels defined by spaced upright walls with the containers to be dispensed lying within the vending channels, the dispensing means including a plurality of releasing mechanisms located adjacent each other and able to be separately or coactively controlled so that the vending channels can be divided into defined portions to receive different sized containers or different content containers and the required separate or adjacent releasing mechanisms can be activated to dispense the required container from the allocated defined portion of the vending channels. The dispensing means can include a bank of releasing mechanisms mounted on a carrier which is separately removable from the dispensing means. The dispensing means includes a plurality of releasing mechanisms located adjacent each other and able to be separably or coactively controlled so that a vending channel can be divided into defined portions to receive different sized containers or different content containers and the required separate or adjacent releasing mechanisms can be activated to dispense the required container from the allocated portion of the vending channel. The plurality of adjacent releasing mechanisms able to dispense from different defined portions of a vending channel is mounted on a carrier which is separably removable from the dispensing means.

In one form of the invention there is provided a vending machine having a plurality of releasing mechanisms which are each able to be activated by respective solenoids and controllable externally of the dispensing means.

In another form of the invention, there is provided a vending machine having a plurality of manually releasing mechanisms which are operable by a linear drive means mounted adjacent a plurality of the manually releasing mechanisms and including a linear track and a solenoid bank able to travel along the linear track and engage a selected one or more of the releasing mechanisms to cause a container to be released from a selected vending channel or portion.

In accordance with another aspect of the invention there is provided a dispensing means which is separate and insertable into a vending machine or integral with a vending machine, for individually dispensing circular cross sectional containers from a staggered stack of containers held in a vending channel in a vending machine, the vending channel having an escape opening at one end, the dispensing means having a releasing mechanism locatable adjacent the escape opening of the vending channel in the vending machine and including a rocking body located in the path of the staggered stack escaping the vending channel and which in one state in combination with a drop chute below or extending from at or near the bottom of the vending channel engages the lowest container and prevents dispensing of the lowest container and in a second state allows movement of the rocking body to dispense the lowest container and return to the first state to prevent the next lowest container from being dispensed.

The rocking body can be latchable, and having an abutting arm and a cradling arm, the rocking body pivotally mounted such that in the first state the rocking body is latched so that the abutting arm is positioned at a distance from the end of the drop chute smaller than the circular cross section of the containers being dispensed so that the lowest container is prevented from being dispensed while in a second state the rocking body is unlatched and pivotally rotates the abutting arm away from the end of the drop chute so as to allow the lowest container to fall to the cradling arm and be dispensed and such that the action of dispensing forces the rocking body to rotate pivotally and return the abutting arm to the first state having a distance from the end of the drop chute less than the cross sectional size of the containers to prevent the next lowest container being dispensed.

The dispensing means includes a plurality of drop chutes and rocking bodies linearly mounted adjacent each other and separately or in combination able to be controlled so as to allow dispensing of various sizes and lengths of containers or to allow separate dispensing of containers from various portions of vending channels located adjacent each other. The separate or combined operation of the rocking bodies is by electronic means, electrical means, mechanical means, or a combination.

In one form of the invention the rocking body includes a solenoid providing the required latch mechanism.

The dispensing means includes a plurality of drop chutes and rocking bodies able to be located below vending channels of a vending machine and allowing dispensing from a selected one or portion of laterally arranged adjacent vending channels. A linear drive system can be included which extends across a plurality of laterally arranged rocking bodies and includes a bank of one or more solenoids that can be transported along a linear track to a position to activate selected rocking bodies so as to dispense the required container from a vending channel or portion.

BRIEF DESCRIPTION OF THE DRAWINGS

In order that the invention is more readily understood, embodiments of the invention will be described with reference to the drawings wherein.

MODE FOR CARRYING OUT THE INVENTION

Figure 1:
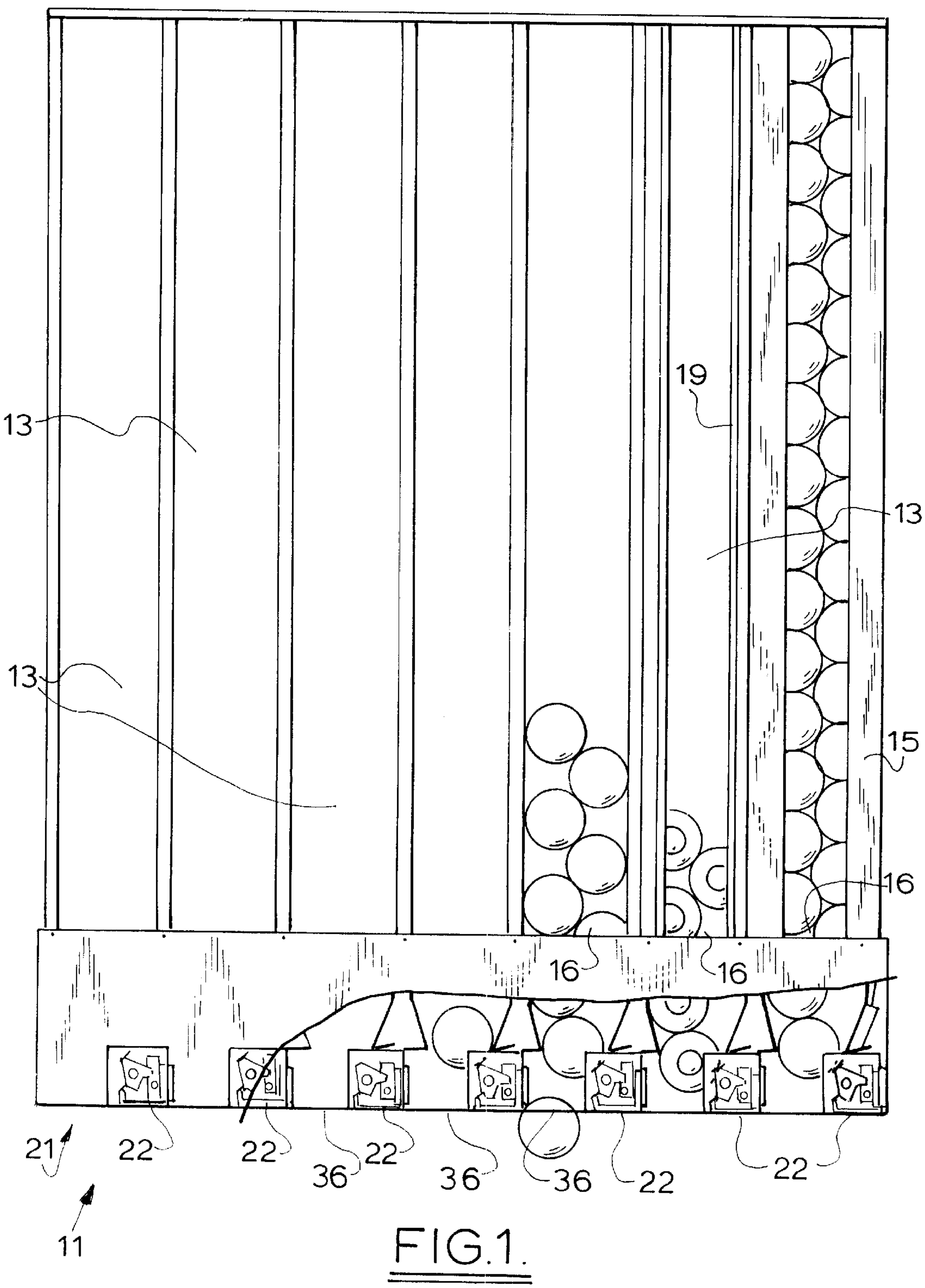
FIG. 1 is a front view of a vending machine with a dispensing means in accordance with one embodiment of the invention.

According to one aspect of the invention as shown in FIGS. 1 to 5, there is provided a vending machine 11 which includes a plurality of vending channels 13 defined by parallel upright walls 15 spaced across an upper part of the vending machine 11. Each wall 15 of the vending machine 11 defining the vending channels 13 ends at a common lower height with escape openings 16 at the lower ends of each vending channel 13. A plurality of circular cross section containers, being cans or bottles, can be stacked in a lying position within the vending channels 13 and can escape through the respective lower escape openings 16. The vending channels 13 include vertical dividers 19 which divide the depth of each vending channel 13 into a plurality of separate defined portions of vending channels located respectively behind each other. Therefore a vending machine having seven laterally adjacent vending channels 13 can be multiplied to twenty-one vending channels by vertical dividers 19 separating each vending channel 12 into three channels located respectively behind each other. Different combinations of portions of vending channels can also be configured to allow various depths that accommodate various sized containers.

A dispensing means 21 is located below the vending channels 13 and adjacent the escape openings 16 but is separate therefrom to allow for retrofitting or removal for repair or servicing. The dispensing means 21 includes a plurality of releasing mechanisms 22 associated with each vending channel 13 or portion of a vending channel to allow separate dispensing of containers from each channel or part. The releasing mechanisms 22 are located in the path of containers escaping through the escape openings 16 of the vending channels 13. A plurality of drop chutes 23 intermediate the releasing mechanisms 22 and the escape openings 16 of the vending channels 13 deflect the containers towards the releasing mechanisms 22. The releasing mechanism 22 includes a rocking body 26 located in the path of containers escaping through the escape opening 16 of each respective vending channel 13 and which in combination with the drop chute 23 prevents the lowest container being released. The subsequently higher containers are thereby retained above the lowest container.

The rocking body 26 includes a planar top abutting arm 28 extending from one side of an intermediate body portion and laterally offset to a lower straight arm extending from an opposite side and which in combination with the intermediate body forms a cradling arm 29 in the shape of a reversed reclined L-shape. The abutting arm 28 and lower straight arm of the cradling arm 29 are at an obtuse angle to the intermediate body portion.

Each rocking body 26 is pivotally mounted below the surface of the abutting arm 28 and cradling arm 29 and is able to be latched or unlatched by a solenoid 31 such that in a first state the solenoid 31 latches the rocking body 26 in a position such that the abutting arm 28 is located a distance from the end 24 of the drop chute 23 which is smaller than the cross sectional size of the container falling from the escape opening 16 of the vending channel 13. The lowest container A is thereby held in position between the abutting arm 28 and the end 24 of the drop chute 23. By control of the solenoid 31 the rocking body 26 is in its second state and unlatched results in the weight of the lowest container A to force the rocking body 26 to pivot around the pivot 27 away from the end 24 of the drop chute 23 to enlarge the opening such that the lowest container A falls into the cradling arm 29. The weight of the lowest container and a return spring rotates the rocking body 26 back to the first position releasing container A through outlet 36 of the dispensing means 21 and causes the abutting arm 28 to engage the second lowest container B and retain it in the lowest position with the solenoid 31 latching the rocking body 26 into the retaining position in its first state.

Figure 4:
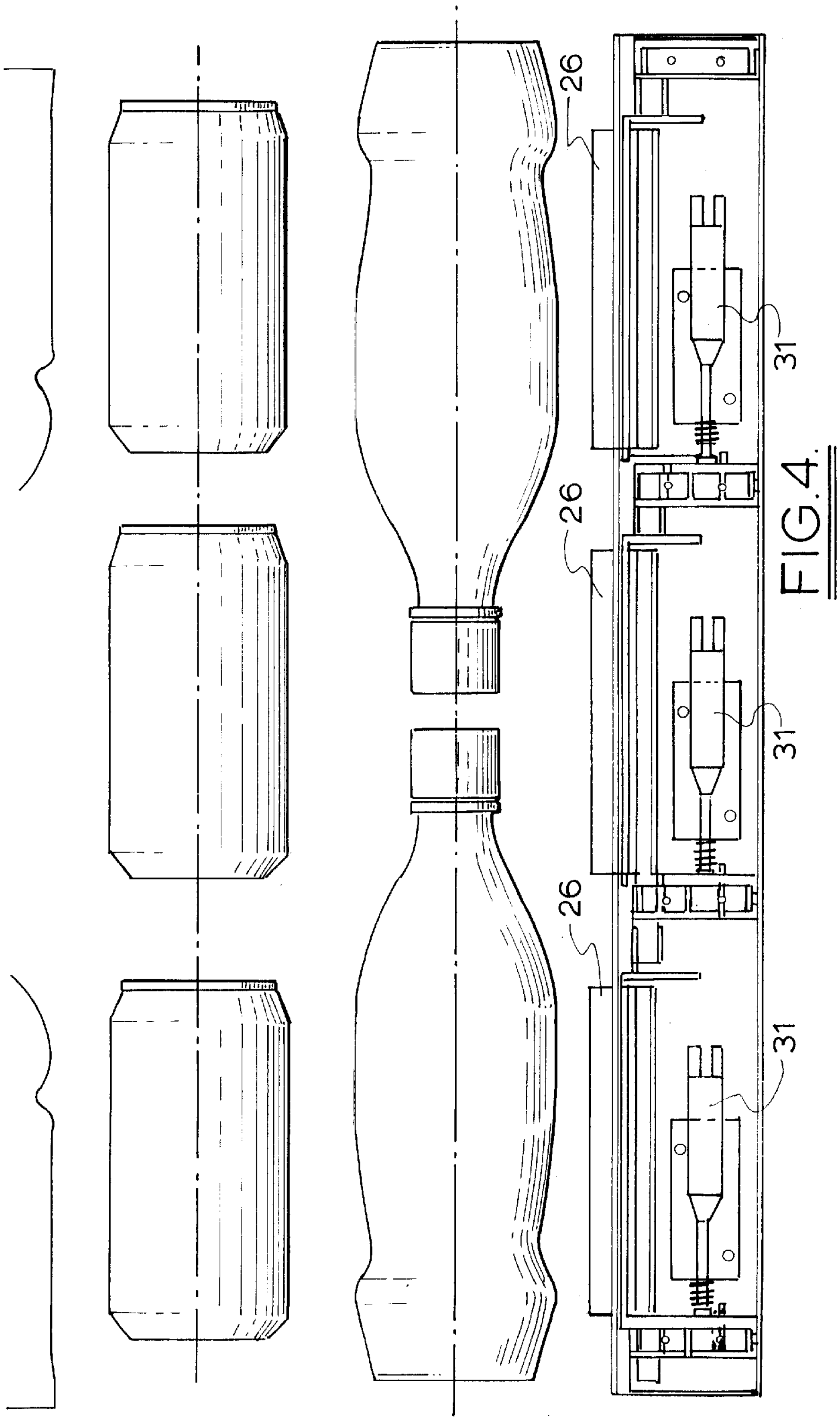
FIG. 4 is a plan view of the dispensing means of FIG. 1.

By having separate controls of the plurality of releasing mechanisms 22 located behind each other in a particular vending channel 13, it is possible to divide the vending channel 13 into a plurality of separate portions which can accommodate various lengths of containers. As shown in FIG. 4, it is possible to dispense three separate cans with each releasing mechanism 22 controlling the release of each row of cans, when three releasing mechanisms 22 including solenoids 31 and rocking bodies 26 are located behind each other. In another configuration it is possible to dispense two rows of bottles lying behind each other which are longer than cans but can be dispensed by activation of the respective front and rear releasing mechanisms while the intermediate releasing mechanism is not active. In a still further configuration two coacting adjacent releasing mechanisms release a bottle which is the size of two releasing mechanisms with cans being dispensed by the third mechanism. In another configuration a bottle the length of all three mechanisms can be released by coacting three adjacent releasing mechanisms.

Figure 2:
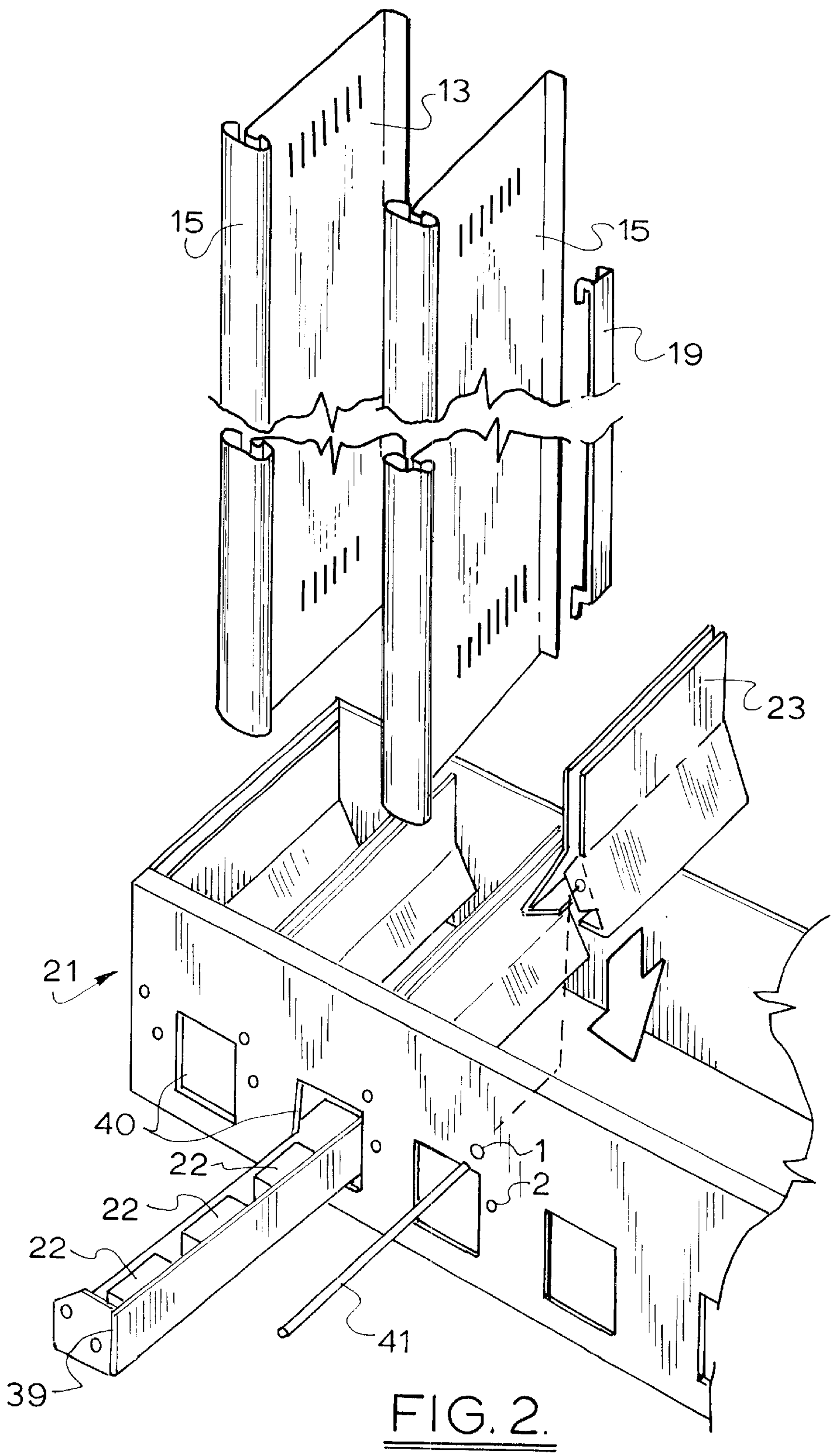
FIG. 2 is an exploded view of a vending machine having a dispensing means in accordance with the embodiment of FIG. 1.
Figure 3:
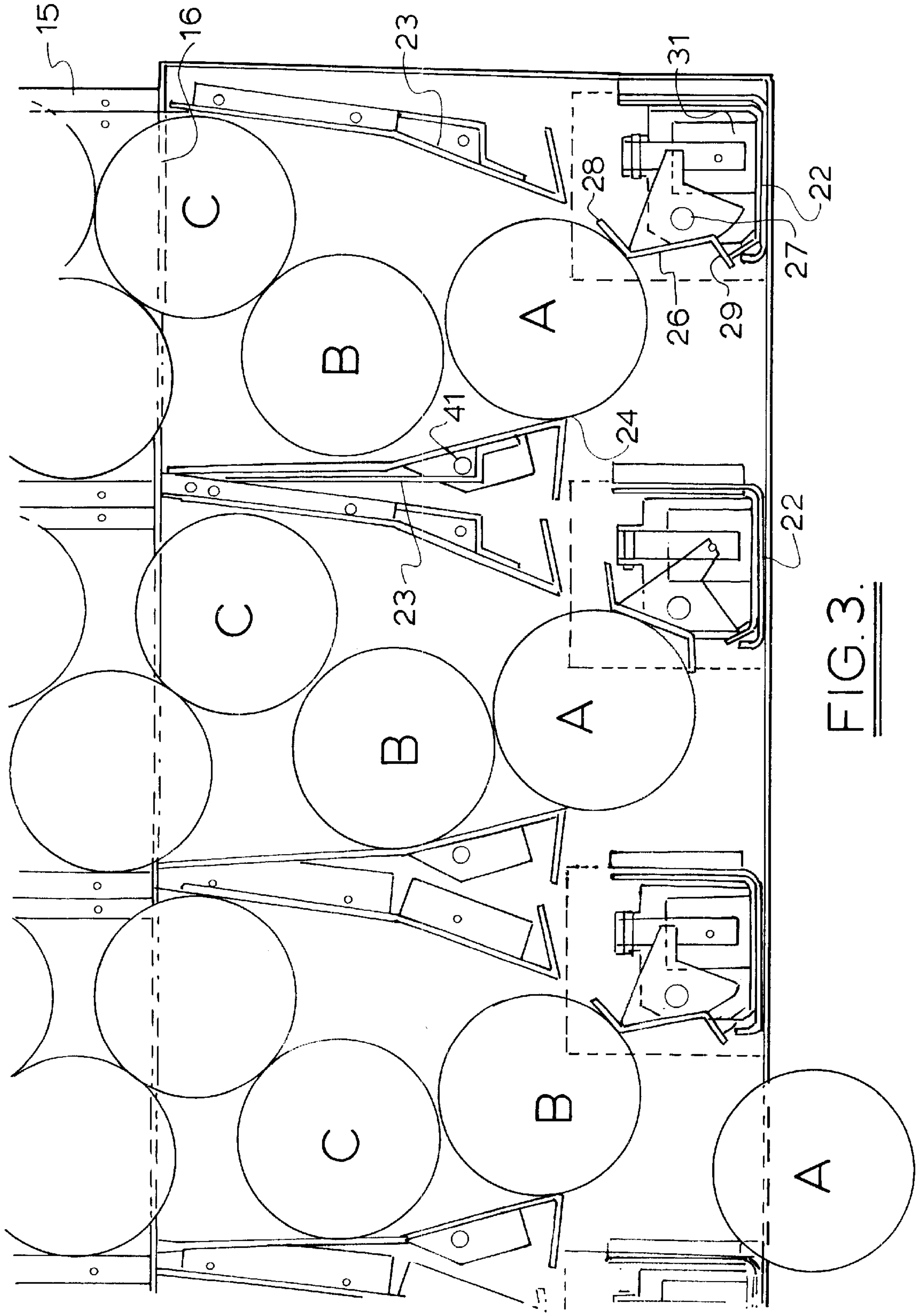
FIG. 3 is a front diagrammatic view of the dispensing means of FIG. 1.
Figure 5:
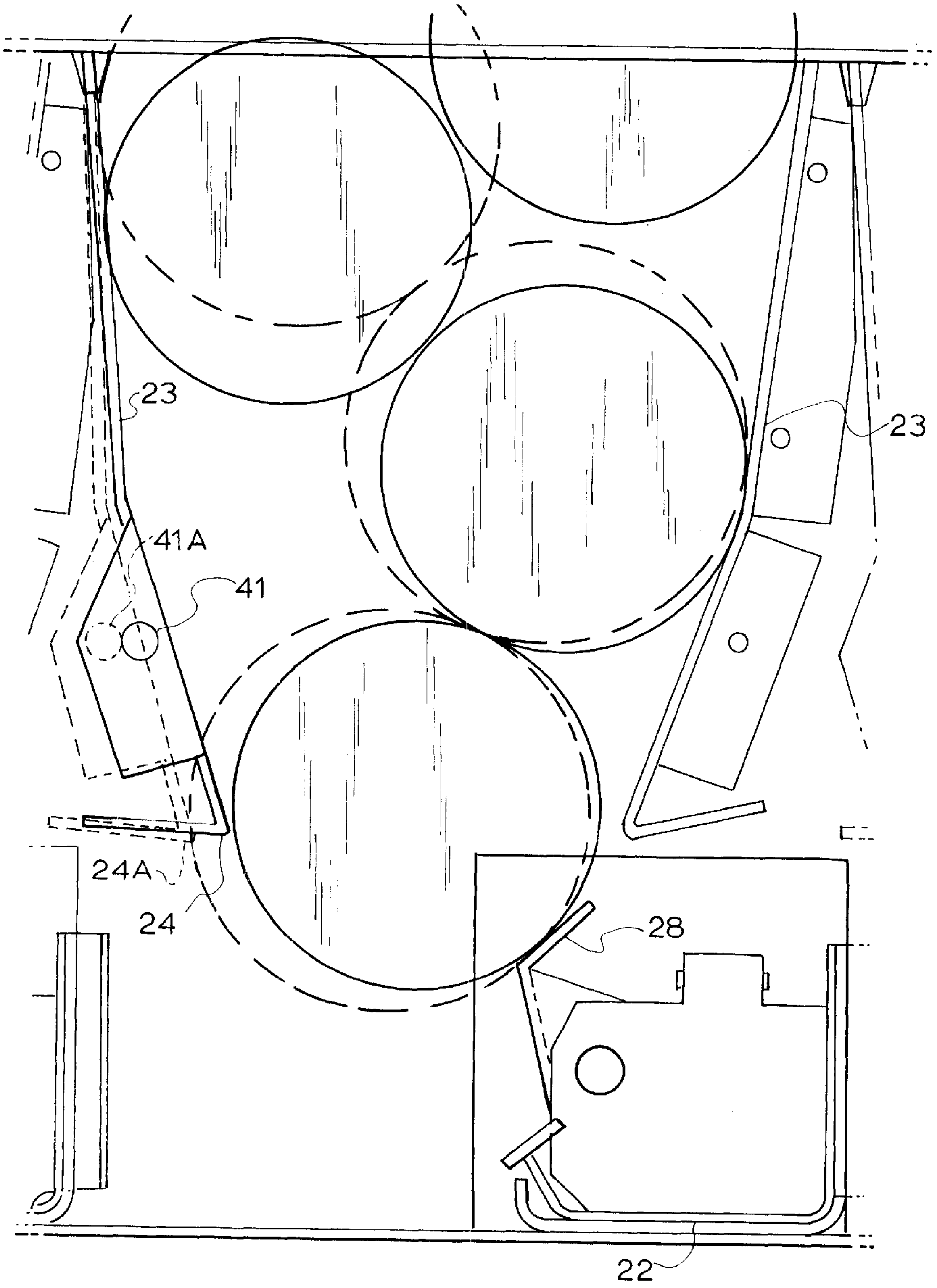
FIG. 5 is an enlarged front view of a portion of the dispensing means of FIG. 1.

In order to accommodate the various circumferential sized containers in the dispensing means 21 an adjusting rod 41 as shown in FIG. 2 can be inserted through the front of the dispensing means 21 to engage the respective drop chutes 23 so as to ensure by positioning of the adjusting rod 41 in position one or position two the relative position of the drop chute 23 as shown in FIG. 5 can be adjusted so that the distance between the end 24 of the drop chute 23 and the abutting arm 28 in its first position is sized smaller than the diameter of the respective containers and thereby is able to hold the containers in a retaining position.

As well as being able to separately dispense containers of various lengths, the arrangement of the releasing mechanisms 22 behind each other below a single vending channel 13 allows the releasing mechanisms 22 to be mounted on a single carrier 39 that is separably removable from the dispensing means 21 by being slidable out through a front opening 40. This allows for any servicing or replacement of any one releasing mechanism 22 on the entire carrier 39 of releasing mechanism 22.

Figure 6:
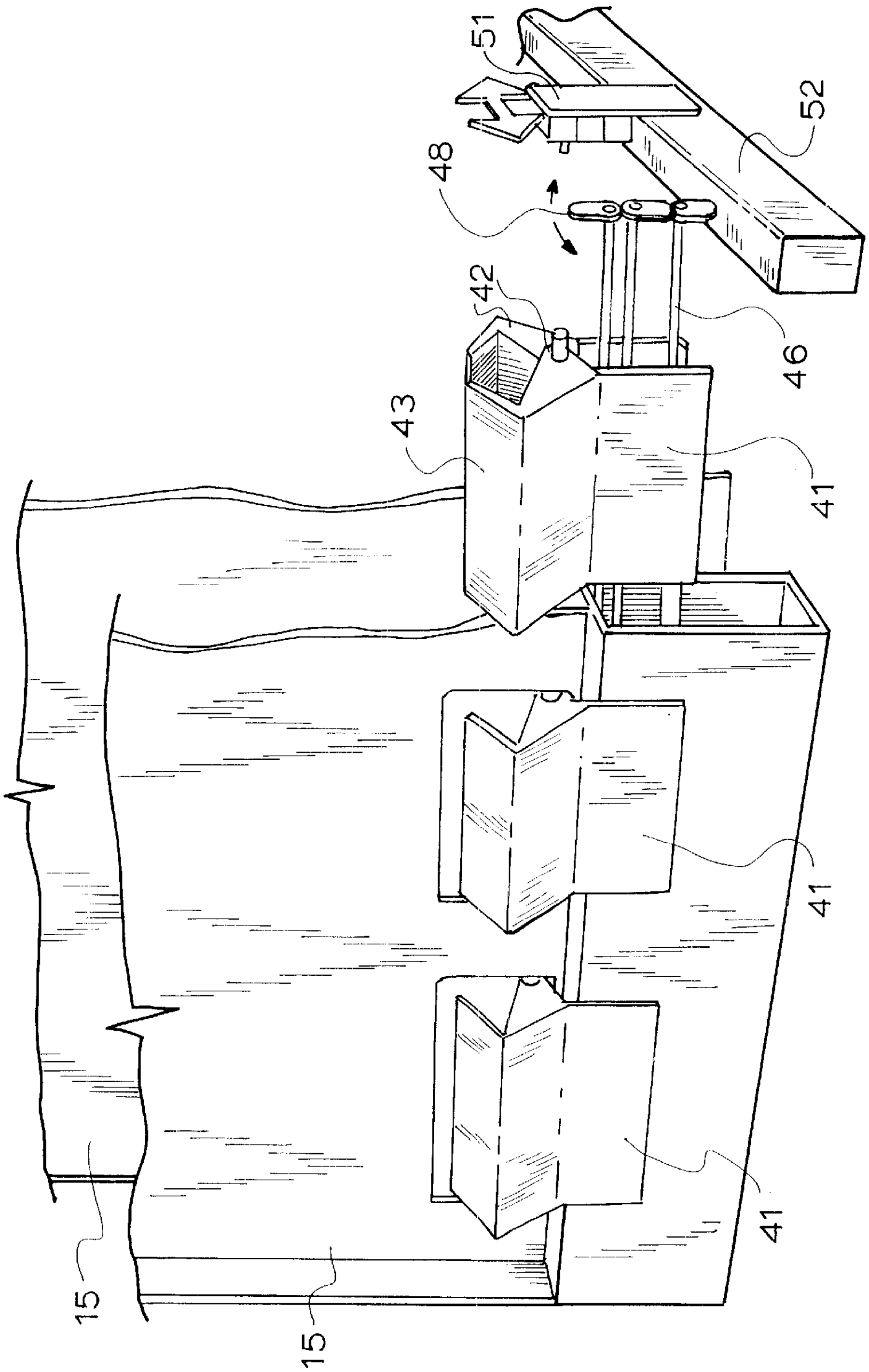
FIG. 6 is a perspective diagrammatic view of a linear drive system in accordance with a second aspect of the invention.
Figure 7:
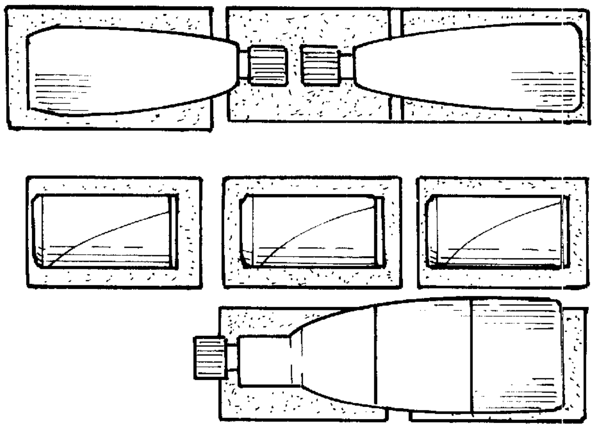
FIG. 7 is an illustrative view of containers in a vending machine that can be used in accordance with the dispensing means of FIG. 6.
Figure 8:
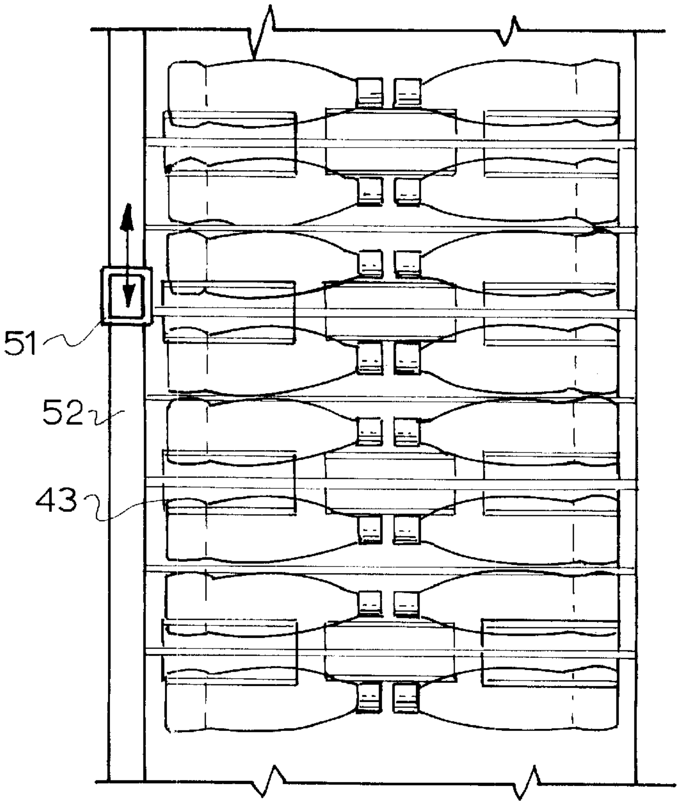
FIG. 8 is a plan diagrammatic view of the linear drive system of FIG. 6.

Referring to FIGS. 6, 7 and 8, there is shown an alternative control means of releasing mechanisms whether they be the releasing mechanisms 22 of the first embodiment including the rocking body 26 and drop chute 23 or releasing mechanisms 41 including a pair of opposing drop rocking bodies 42 which on an upper outer side has a container holding face 43 able to engage the lowermost container in a vending channel 13 and pivotally rotatable so as to dispense the required container from the vending channel or other releasing mechanism. In FIG. 6 there is shown three releasing mechanisms 41 located behind each other to dispense containers from one or more defined portions of a vending channel 13 located behind each other. The control and movement of the plurality of drop rocking bodies 42 around their respective pivots by elongated latching levers 46 including rods 47 extending parallel from each releasing mechanism 41 through a central lower part of the front releasing mechanism 41 to the front of the dispensing means 21 and ending with cams 48. A solenoid bank 51 which is drivable along a linear drive 52 extending across the front of the dispensing means 21 allows the solenoid bank 51 to be located and engage the cams 48 of the latching levers 46 associated with any one of the seven laterally adjacent vending channels 13. By the structure of the linear drive means this can be separably removable from the dispensing means 21.

As shown in FIG. 7, when three releasing mechanisms 41 including drop rocking bodies 42 are located behind each other, it is possible to dispense three separate cans with each releasing mechanism 41 controlling the release of each row of cans. In another configuration it is possible to dispense two rows of bottles lying behind each other which are longer than cans but can be dispensed by activation of the respective front and rear releasing mechanisms by the respective latching levers 46 while the intermediate releasing mechanism is not active. In a still further configuration two adjacent releasing mechanisms are jointly coactivated to release a bottle which is the size of two releasing mechanisms with cans being dispensed by the third mechanism. In another configuration a bottle the length of all three mechanisms can be released by coactivating three adjacent releasing mechanisms.

Figure 9:
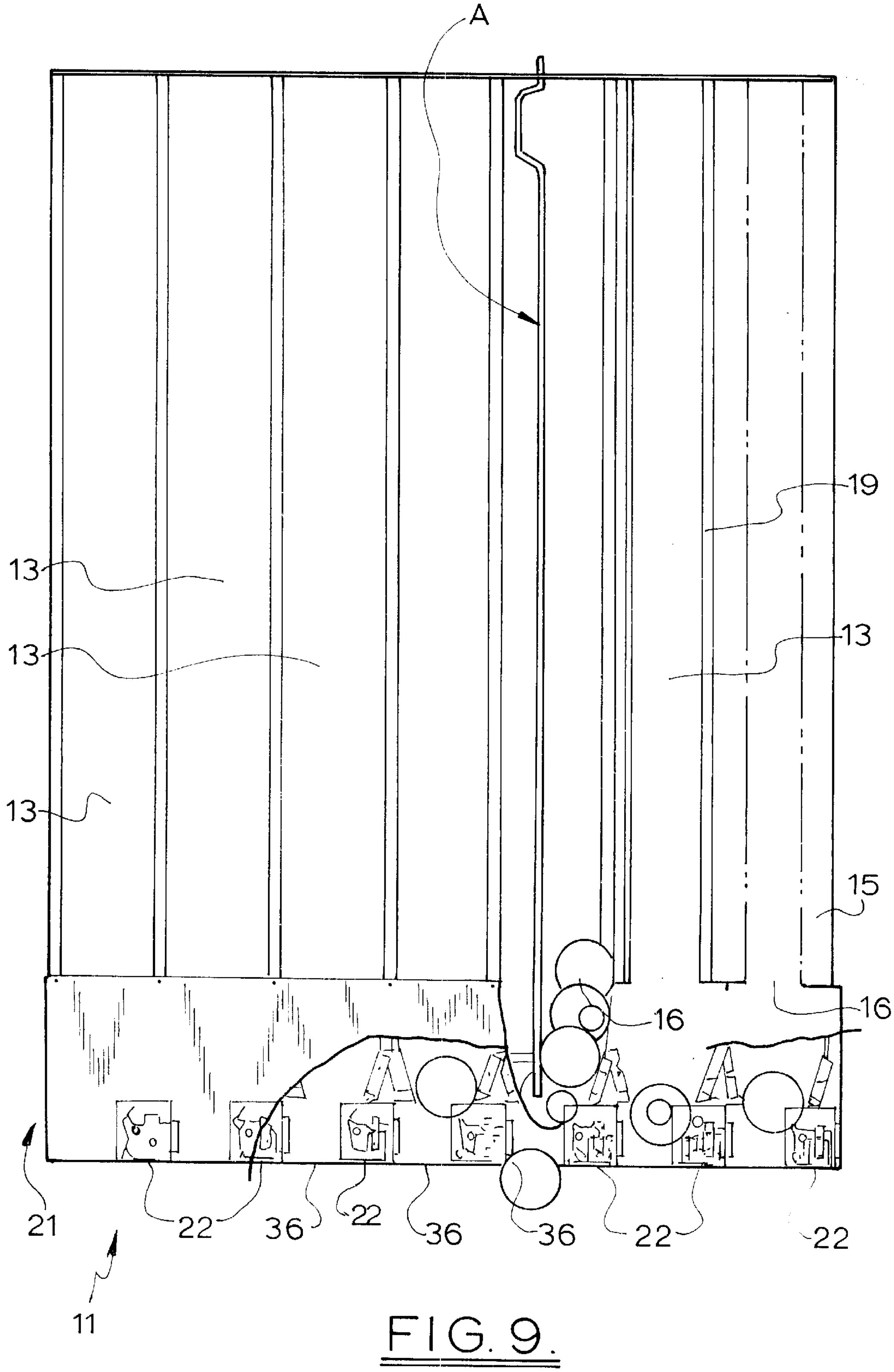
FIG. 9 is a front view of the vending machine of FIG. 1 but including a further adjustment means.

Referring to FIG. 9, there is shown an improvement of a vending machine 11 substantially constructed similar to the vending machine of FIG. 1 but including an adjustment means in the form of an adjustment control rod 53 extending vertically substantially the entire length of a vending channel 13.

Generally, drink containers have been needed to be retained as a cylindrical shape such as cans of liquid. However, when a variation of this shape occurs such as in plastic drink bottles, the shape generally always includes two spaced outer radial contact points forming the outermost parts of the plastic drink bottle and forming the contact points with the dispensing or vending channel. That is, the two spaced contact points are parallel, equal sized circular cross sections and since forming the outermost parts of the article simulate a cylindrical product. Therefore, it has been the limitations of dispensing channels that has limited the allowable shape of dispensable drink containers or other containers. It has not been possible to have a drop down vending system for other shaped containers. Such containers as chip packages are held by individual clips or fed by spiral worm drive dispensing means.

Figure 10:
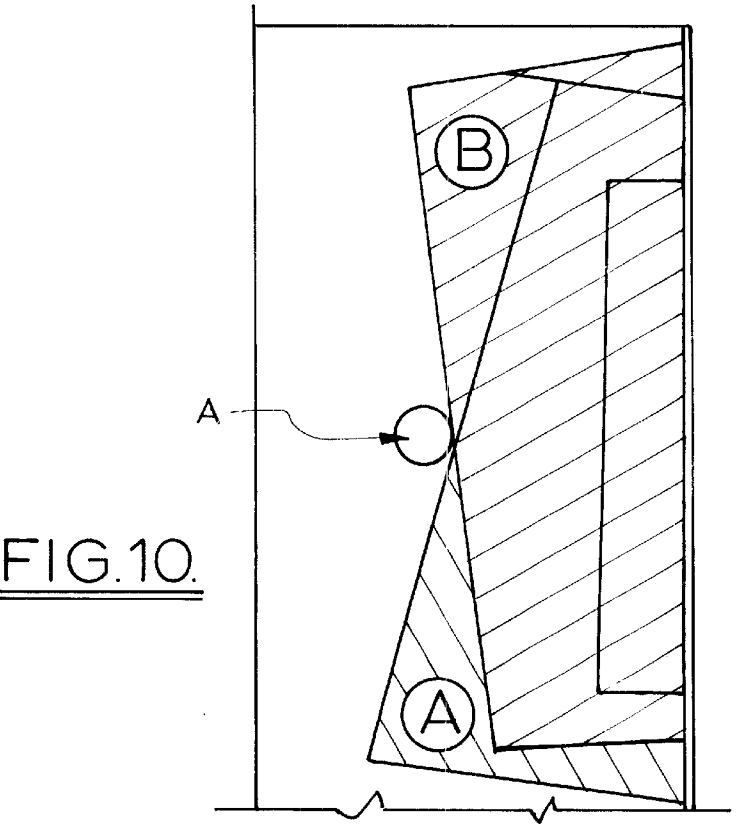
FIG. 10 is a partial horizontal cross section of a vending channel of the vending machine of FIG. 9.
Figure 11:
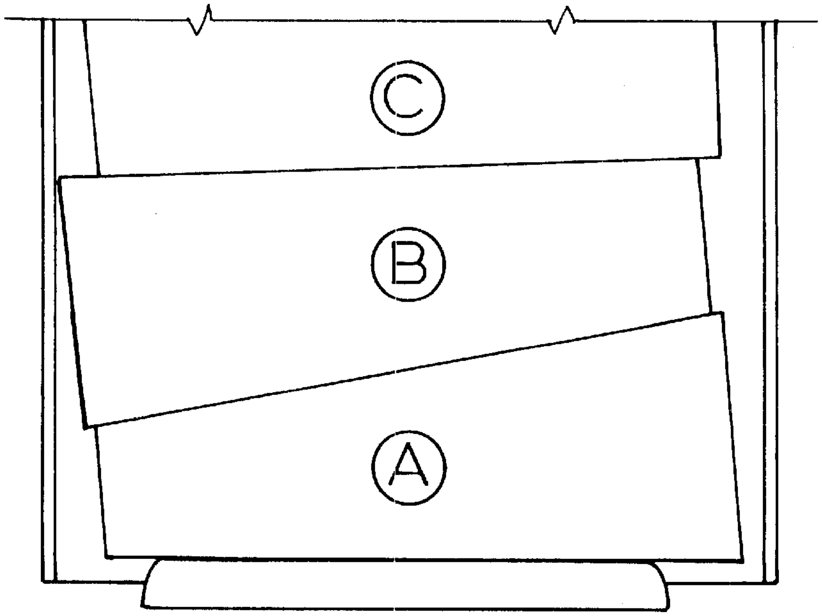
FIG. 11 is a side view of FIG. 10.

It has been found that by inclusion of an adjustment control rod 53 forming the adjustment means located down a vending channel substantially vertically and in the center of the channel as shown in FIG. 10 that conical shaped containers can be dispensed. An important aspect of this dispensing is that the conical containers can be loaded in the vertical vending channel 13 in opposing directions as shown in FIG. 11 to compensate for the sloping sides of the vessels. This creates a level stack to overcome the problems of the vessels diving.

The vertical adjustment control rod 53 is mounted within the rack with facility for adjustment at the top and bottom to facilitate various sizes of product. A plate or contoured shape may also be used in place of the rod 53 to provide this facility. The adjustment control rod 53 extends from the uppermost part of the venting channel down through the lower escape opening 16 of the vending channel 13 and into the dispensing means to finish substantially alongside the releasing mechanism 22. The particular releasing mechanism 22 described beforehand substantially assists in the dispensing aspect of these non-cylindrical articles.

The vertical adjustment control rod 53 is positioned approximately equal distance between the vending channel walls 15 thus controlling the stack. The other controlling factor are the gates or end walls front and rear which prevent the vessels drifting apart. Thus, between the controlling gates at each end and the bar in the middle, the vessels feed down evenly and orderly into the standard drop mechanism. It is thereby possible to dispense products other than drinks in the vending machine of the invention including ice cream and other snack foods.

Figure 12:
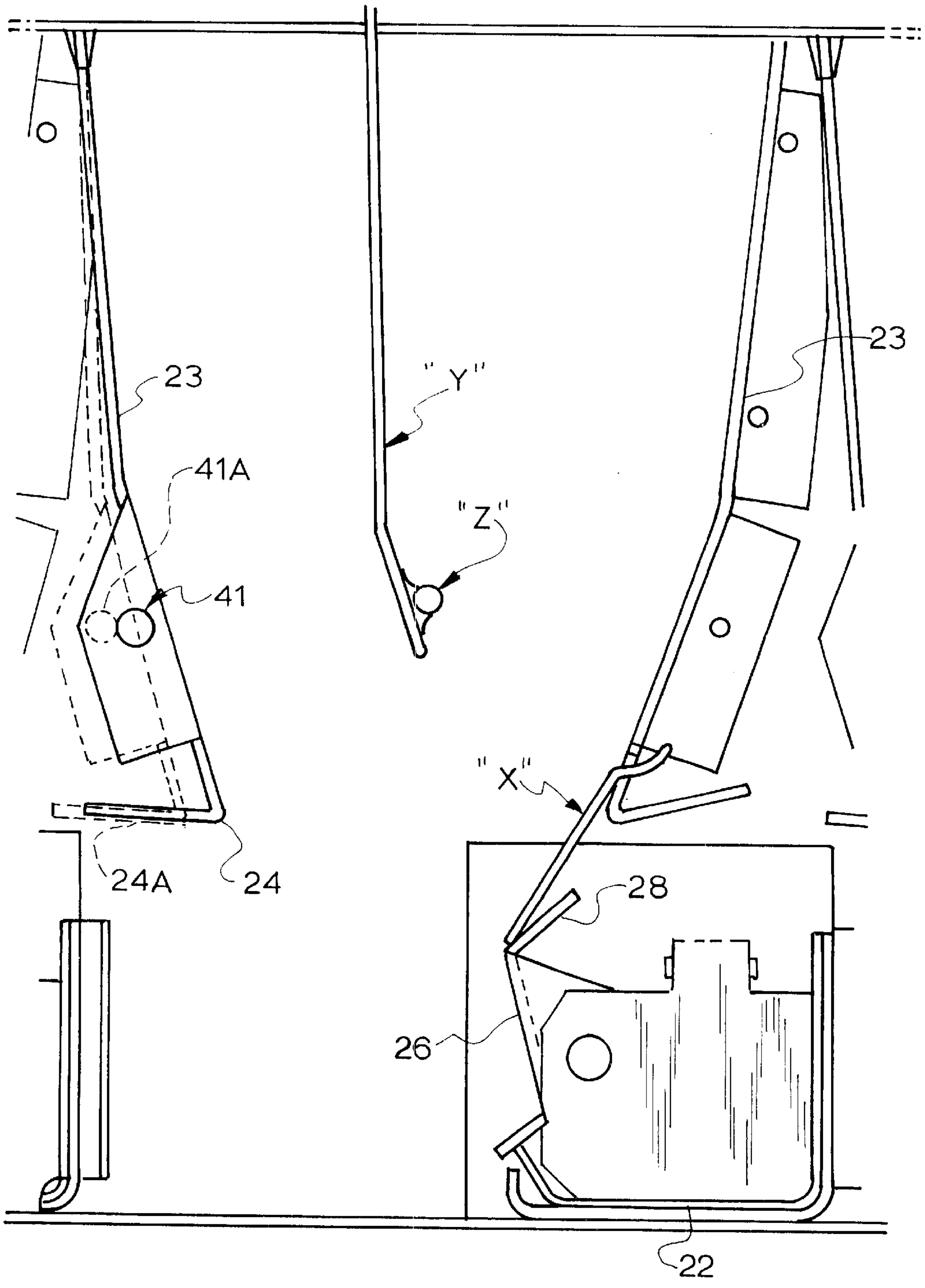
FIG. 12 is an enlarged front view similar to FIG. 5 of a portion of the dispensing means of FIG. 1 including a second embodiment of an adjustment means.
Figure 13:
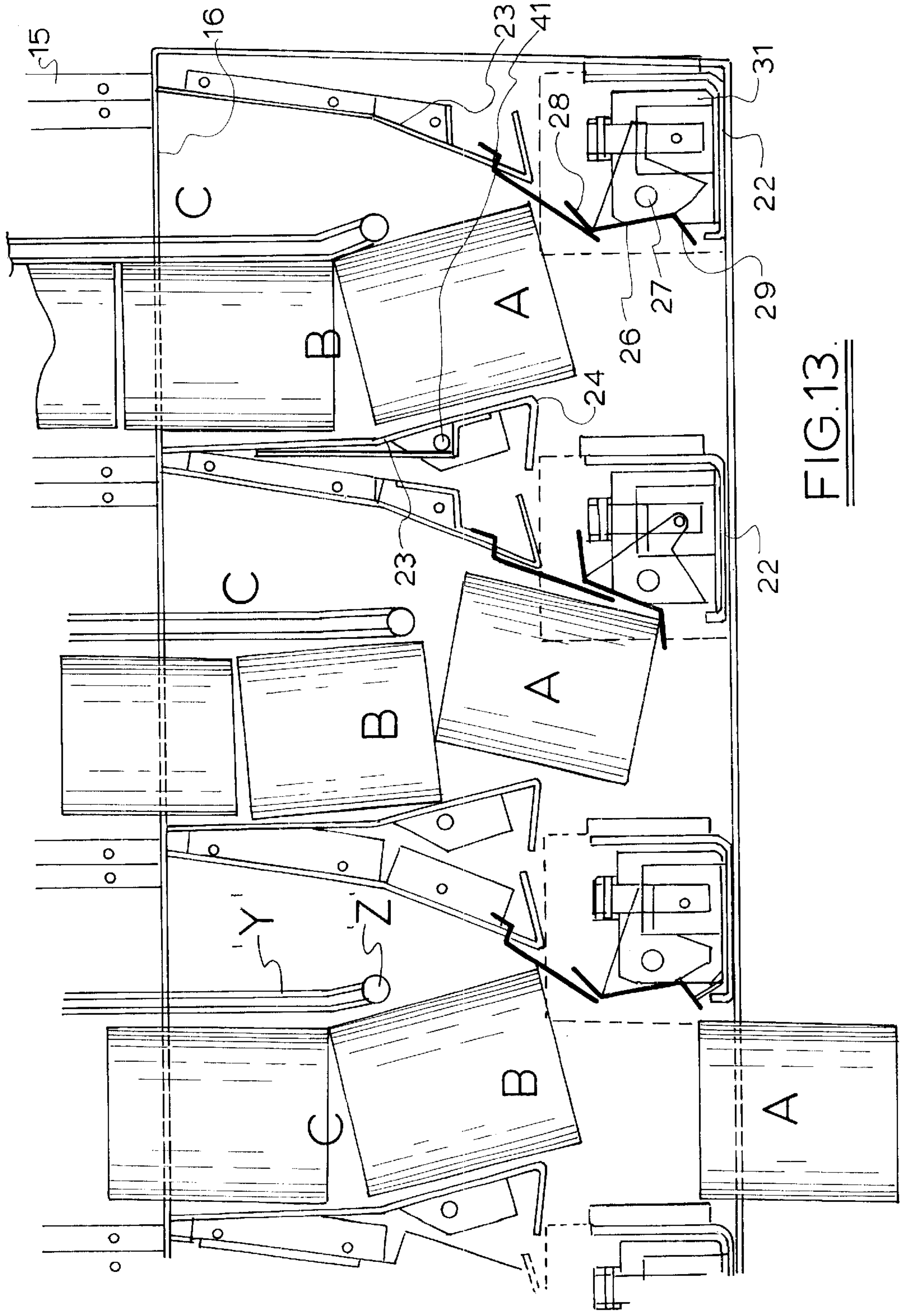
FIG. 13 is a front diagrammatic view of the dispensing means of FIG. 12.

Referring to FIGS. 12 and 13, there is shown a mechanism for dispensing non-symmetrical and/or angled edge product. In particular, FIG. 13 shows block type products A, B and C being dispensed from a vending machine having a different adjustment means Y. For these block products the adjustment means Y can be a continuous plate or movable wall adjusted to the relevant size of the block products and having a bent lower edge corresponding with the inward turn of the side wall adjacent the releasing mechanism 22. It further includes an adjustment rod Z extending inwards from the front wall so as to provide a means of adjusting the position of the adjustment control wall Y. This rod Z can extend out of the machine so as not to require reconstruction of the vending channels 16 for vending different products.

The releasing mechanism 22 as previously described further includes on the end of the drop chute 23 an extension flap X fitted in a hinged manner by a bent top part inserted through a slot near the bottom of the drop chute 23 so that the flap X is held in position but is able to move at an angle to the end internal wall of the drop chute 23. The extension flap X also has a length sufficient to be able to engage the rocking body 26 and particularly the top abutting arm 28.

As shown in FIG. 13, when block products A, B and C proceed down the modified channel formed by the adjustment means Y, the opposing drop chute 23 angles the product towards the releasing mechanism 22 and particularly towards the rocking body 26 and the flap X extending from the drop chute on the side of the releasing mechanism 22. The corner of the lowest product encounters the extension flap X and/or the top of the rocking body 26. Therefore by usual operation of the releasing mechanism 22, and latching in a manner to rotate the rocking body 26 in a clockwise direction for a limited angular rotation, the top of the rocking body 26 and the extension flap X move away from the opposing drop chute 23 so as to provide room and allow the bottom container to drop. The container then encounters the lower part of the rocking body 26 being an outward extending arm and by further dropping of the product the rocking body 26 is latched back to an initial non-vending position where the other part of the rocking body 26 and the extension flap X have minimised the distance to the opposing drop chute 23 so as to prevent the next article being able to drop until further latching of the rocking body 26.

It can be seen that by use of the adjustment means and the relevant benefits of the releasing mechanism, the vending machine is now able to dispense non-symmetrical cross sectional containers such as rectangular or octagonal cross sectional containers which slide into the flap when the solenoid activates the releasing mechanisms. Further, the barrier formed by the adjustment means Y controls products in the columns to feed it in the vending channels towards the rocking body 26 and is adjusted by the adjustment rod Z through holes in the front mechanisms.

Clearly the embodiment shown is an example only and other obvious variations of the embodiments are included within the scope of this invention. In particular the adjustment arm Y for non-symmetrical and/or angle edged products may be incorporated into the opposing wall of the vending channels.

It is thought that the present invention and its advantages will be understood from the foregoing description and it will be apparent that various changes may be made thereto without departing from the spirit and scope of the invention or sacrificing all of its material advantages, the forms hereinbefore described being merely preferred or exemplary embodiments thereof.

What is claimed is:

1. A dispensing means which is locatable below a plurality of vending channels defined by spaced upright walls with containers to be dispensed lying within the vending channels, said dispensing means comprising:

a plurality of releasing mechanisms located adjacent each other and able to be separately or jointly controlled so that the vending channels can be divided into defined portions to receive different sized containers or different content containers and the required separate or adjacent releasing mechanisms can be activated to dispense the required container from a stack in the defined portion of the vending channel;

wherein each of the releasing mechanisms includes a rocking body locatable in the path of the stack escaping the vending channel and which in one state in combination with a drop chute, that is locatable below or extending from at or near the bottom of the vending channels, engages the lowest container and prevents dispensing of the lowest container and in a second state allows movement of the rocking body to dispense the lowest container and return to the first state to prevent the next lowest container from being dispensed; and wherein the rocking body in latchable, and has an abutting arm and a cradling arm, the rocking body pivotally mounted such that in the first state the rocking body is latched so that the abutting arm is positioned at a distance from the end of the drop chute smaller than the circular cross section of the containers being dispensed so that the lowest container is prevented from being dispensed, and while in the second state the rocking body is unlatched and allows pivotal rotation of the abutting arm away from the end of the drop chute so as to allow the lowest container to fall to the cradling arm and be dispensed and such that the action of dispensing and/or a resilient means forces the rocking body to pivotally rotate and return the abutting arm to the first state having a distance from the end of the drop chute less than the cross sectional size of the containers to prevent the next lowest container being dispensed.

2. A dispensing means in accordance with claim 1 wherein the dispensing means is removably locatable in a vending machine.

3. A dispensing means in accordance with claim 1 wherein a plurality of the adjacent releasing mechanisms which are able to dispense from different defined portions of the vending channel are mounted on a carrier rack which is removable.

4. A dispensing means in accordance with claim 3 wherein the dispensing means is removably locatable in a vending machine.

5. A dispensing means in accordance with claim 3 having a plurality of the releasing mechanisms able to be activated by respective solenoids which are controllable externally of the carrier rack.

6. A dispensing means in accordance with claim 5 wherein the plurality of releasing mechanisms and their respective driving solenoids are mounted on the carrier rack.

7. A dispensing means in accordance with claim 3 having a plurality of manual releasing mechanisms which are selectively operable by a drive means mounted adjacent the plurality of releasing mechanisms and including a track and a solenoid bank able to travel along the track and engage a selected one or more of the releasing mechanisms to cause a container to be released from a selected vending channel or defined portion.

8. A dispensing means in accordance with claim 1 having a plurality of manual releasing mechanisms which are selectively operable by a drive means mounted adjacent the plurality of releasing mechanisms and including a track and a solenoid bank able to travel along the track and engage a selected one or more of the releasing mechanisms to cause a container to be released from a selected vending channel or defined portion.

9. A dispensing means in accordance with claim 1 wherein the dispensing means includes a plurality of drop chutes and rocking bodies linearly mounted adjacent each other and separately or in combination able to be controlled so as to allow dispensing of various sizes and lengths of containers or to allow separate dispensing of containers from various portions of vending channels located adjacent each other.

10. A dispensing means in accordance with claim 1 wherein the separate or combined operation of the rocking bodies is by electronic means, electrical means, mechanical means, or a combination.

11. A dispensing means in accordance with claim 1 wherein the releasing mechanism includes a solenoid providing the required latch mechanism.

12. A vending machine, comprising:

spaced upright walls defining a plurality of vending channels with containers to be dispensed lying within the vending channels; and a dispensing means located below the plurality of vending channels and including a plurality of releasing mechanisms located adjacent each other and able to be separately or coactively controlled so that the vending channels can be divided into defined portions to receive different sized containers or different content containers and the required separate or adjacent releasing mechanisms can be activated to dispense the required container from the allocated defined portion of the vending channels, the dispensing means further including a plurality of the releasing mechanisms mounted on a carrier rack which is removable from the vending machine.

13. A vending machine in accordance with claim 12 having a plurality of manually releasing mechanisms which are operable by a drive means mounted adjacent the plurality of the manually releasing mechanisms and including a track and a solenoid bank able to travel along the track and engage a selected one or more of the releasing mechanisms to cause a container to be released from a selected vending channel or defined portion.

14. A vending machine in accordance with claim 12 wherein a plurality of the releasing mechanisms are each able to be activated by respective solenoids and controlled externally of the dispensing means.

15. A vending machine, comprising:

spaced upright walls defining a plurality of vending channels with containers to be dispensed lying within the vending channels;

a dispensing means located below the plurality of vending channels and including a plurality of releasing mechanisms located adjacent each other and able to be separately or coactively controlled so that the vending channels can be divided into defined portions to receive different sized containers or different content containers and the required separate or adjacent releasing mechanisms can be activated to dispense the required container from the allocated defined portion of the vending channels; and a plurality of manually releasing mechanisms which are operable by a drive means mounted adjacent the plurality of the manually releasing mechanisms and including a track and a solenoid bank able to travel along the track and engage a selected one or more of the releasing mechanisms to cause a container to be released from a selected vending channel or defined portion.

16. A dispensing means which is separate and insertable into a vending machine or integral with a vending machine, for individually dispensing circular or approximately circular cross sectional containers from a staggered stack of containers held in a vending channel in a vending machine, the vending channel having an escape opening at one end, the dispensing means comprising:

a releasing mechanism locatable adjacent the escape opening of the vending channel in the vending machine and including a rocking body located in the path of the staggered stack escaping the vending channel and which in one state in combination with a drop chute below or extending from at or near the bottom of the vending channel engages the lowest container and prevents dispensing of the lowest container and in a second state allows movement of the rocking body to dispense the lowest container and return to the first state to prevent the next lowest container from being dispensed;

wherein the rocking body is latchable and includes an abutting arm and a cradling arm, the rocking body pivotally mounted such that in the first state the rocking body is latched so that the abutting arm is positioned at a distance from the end of the drop chute smaller than the circular cross section of the containers being dispensed so that the lowest container is prevented from being dispensed while in a second state the rocking body is unlatched and pivotally rotates the abutting arm away from the end of the drop chute so as to allow the lowest container to fall to the cradling arm and be dispensed and such that the action of dispensing and/or resilient means forces the rocking body to pivotally rotate and return the abutting arm to the first state having a distance from the end of the drop chute less than the cross sectional size of the containers to prevent the next lowest container being dispensed.

17. A dispensing means in accordance with claim 16 wherein the dispensing means includes a plurality of drop chutes and rocking bodies linearly mounted adjacent each other and separately or in combination able to be controlled so as to allow dispensing of various sizes and lengths of containers or to allow separate dispensing of different content containers from various defined portions of vending channels located adjacent each other.

18. A dispensing means in accordance with claim 16 wherein the separate or combined operation of the rocking bodies is by electronic means, electrical means, mechanical means, or a combination.

19. A dispensing means in accordance with claim 16 wherein the rocking body includes at least one solenoid providing the required latch mechanism.

20. A dispensing means in accordance with claim 16 including a plurality of drop chutes and rocking bodies able to be located below vending channels of a vending machine and allowing dispensing from a selected one or portion of laterally arranged adjacent vending channels.

21. A dispensing means in accordance with claim 16 wherein a linear drive system is includes which extends across a plurality of laterally arranged rocking bodies and includes a bank of one or more solenoids that travels along a linear track to a position to activate selected rocking bodies so as to dispense the required container from a vending channel or defined portion.

22. A vending machine having a dispensing means located below a plurality of vending channels defined by spaced upright walls or barriers with containers to be dispensed being of a conical or tapered shape and at least one of the upright walls or barriers forming an adjustment rod or profiled shape spaced a distance from the opposite wall in a central portion so as to engage a central diameter of the containers to be dispensed whereby the containers can be stacked in the vending channels in alternating opposing directions so as to maintain a substantially level stack.

23. A vending machine in accordance with claim 22 wherein the releasing mechanism below the vending channel comprises a rocking body pivotally mounted such that in the first state the rocking body is latched so that an abutting arm is positioned a distance from the end of a drop chute below the vending channel smaller than the central cross section of the container being dispensed so that the lowest container is prevented from being dispensed and while in the second state the rocking body is unlatched and pivotally rotates the abutting arm away from the end of the drop chute so as to allow the lowest container to fall and be dispensed.

24. A vending machine in accordance with claim 23 wherein the drop chute above the releasing mechanism includes a hinged extension flap engaging the top part of the rocking body so as to encounter edges of products being dispensed.

* * * * *